Sept. 10, 1929.   H. RIESELER   1,727,903
HYDRAULIC TRANSMISSION GEAR
Filed June 18, 1925
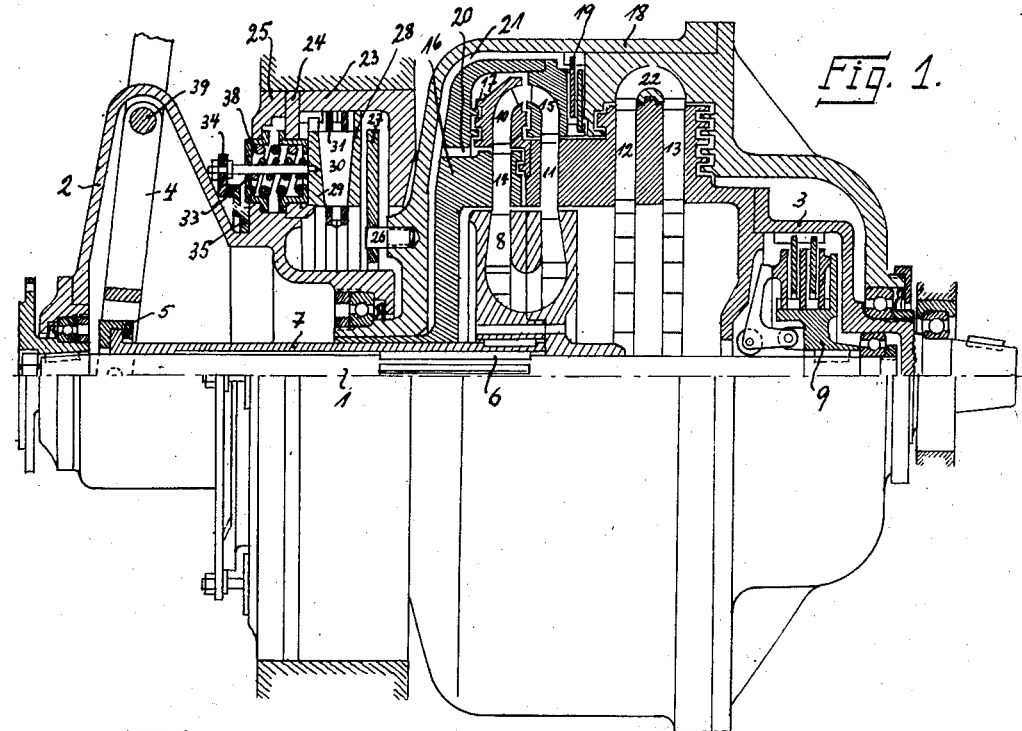
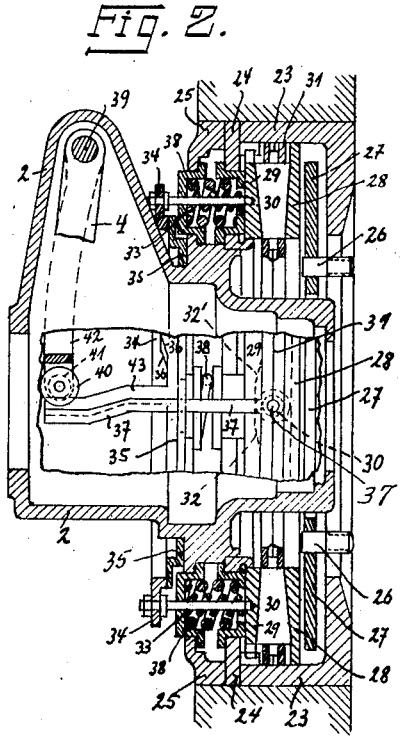
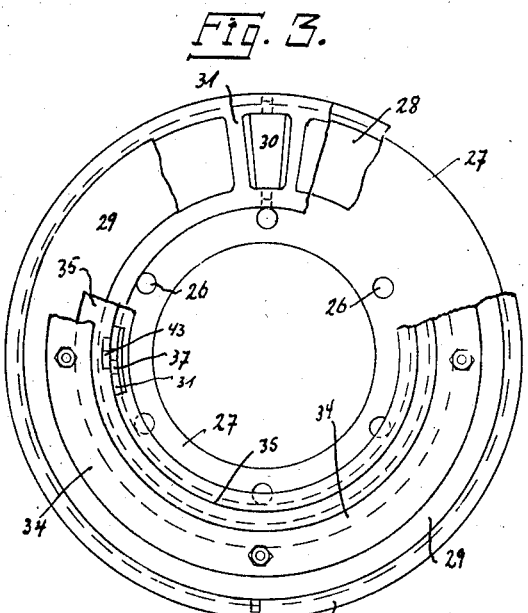
INVENTOR
HERMANN RIESELER
BY Richards & Geier
ATTORNEYS Patented Sept. 10, 1929.

1,727,903

UNITED STATES PATENT OFFICE.

HERMANN RIESELER, OF HAMBURG, GERMANY.

HYDRAULIC TRANSMISSION GEAR.

Application filed June 18, 1925, Serial No. 38,073, and in Germany June 21, 1924.

The invention relates to hydraulic transmission gearing with one or more driven blade wheel groups, wherein the guide blade rims adapted to take up the reaction torque are capable of being brought into and out of operation, the gearing being also provided with a relatively axially movable centrifugal driving pump and with a connection adapted to be brought into and out of operation between the driving shaft and the driven shaft.

The locking and releasing of the connection of the guide blade rim, heretofore accomplished by means of hand-operated brakes or clutches, requires an operative force proportionate to the reaction torque to be taken up by said rim, thus rendering the manual operation very difficult.

The object of the present invention is to avoid the use of the power necessary for manually locking the guide blade rims, and to facilitate the operation of the mechanism. According to the invention this object is obtained by the use of automatic locking means for the guide blade rims.

The essential feature of the invention resides therein that the guide blade rims are coupled automatically to a guide blade rim carrier, formed as a rotary casing, by the liquid pressure produced by the centrifugal driving pump, whilst the guide blade rim carrier itself can be locked in one of the turbine stages by a suitable coupling for this purpose, for example, a free wheel clutch when the mechanism is operated, and when there is a direct connection between the driving shaft and the driven shaft can again be released.

The subject of the invention can be applied to hydraulic gears in which a change of speed and torque of the driven shaft takes place in only one direction of rotation, and also in such hydraulic gears, in which in addition to the change of speed and torque of the driven shaft in one direction of rotation, a change of direction of rotation of the driven shaft can also be effected.

The application of the subject of the invention is shown in one embodiment in the drawing and hereinafter described.

Figure 1 is a view, partly in longitudinal section and partly in side elevation, of a hydraulic gearing constructed in accordance with the invention;

Figure 2 is an enlarged longitudinal section, partly broken away, of the coupling mechanism employed; and Figure 3 is a front elevation, partly broken away, of said coupling mechanism.

The driving shaft 1 is rotatably mounted in the usual manner in the stationary casing part 2, and at the rear in the driven part 3. By the control lever 4 and the driving head 5 the hollow shaft 7 is axially movable in ribs 6 on the driving shaft 1. The hollow shaft 7 serves to support and operate the centrifugal driving pump 8. In the rear end position of the pump 8 the driving shaft 1 is directly connected by the clutch 9 to the driven part 3. To the driven part 3 are rigidly connected the driven blade rims 10 (first driven blade rim for backward drive), 11 (second driven blade rim for backward drive), 12 (first driven blade rim of the turbine forward drive) and 13 (second driven blade rim of the turbine forward drive). The reversing blade rim 14 and the guide blade rim 15 of the backward drive are rigidly connected to the bell shaped guide rim body 16 which is mounted so as to be rotatably and axially movable. The guide rim body 16 is provided with labyrinth packings 17 and 17¹. For connecting the parts 14, 15 and 16 to the guide blade rim carrier 18, formed as a casing, during the operation of the backward drive, a clutch 19 is provided. The actuation of this clutch 19 is effected automatically through the impact of the pump 8 with the driven blade rims 10 and 11 and the excess pressure produced between the blade rims 14 and 10, which passes through passages 20 into the space 21, moves the bell shaped guide rim body 16 axially and presses the bearing ring of the blade rim 15 against the clutch 19. If the centrifugal driving pump is moved from its operative position in backward drive the coupling pressure in the space 21 disappears automatically and the parts 14, 15 and 16 can again rotate freely without being connected to casing 18.

For coupling the casing 18 to the stationbine stage there is provided an automatic free wheel brake of which the parts 23, 24 and 25 are rigidly connected to the stationary casing part 2. The casing 18 is provided with pivots 26 on which the disc 27 can be moved axially. In the fixed part 23 a lining ring 28 is rotatably and axially movable. Between this rotary ring 28 and a non-rotatable ring 29 which is only axially movable a number of rollers 30 are mounted in a roller cage 31 which is rotatable and axially movable in the fixed part 23. The ring 29, which for each roller is provided with running planes 32 and 32' (Figure 2), is engaged by a number of springs 33 which are seated in the wall 25 and tend to press the ring 29 against the rollers 30. To the ring 29 is rigidly connected a lifting ring 34 which, for the purpose of releasing the rollers 30, is lifted by turning the ring 35 towards the inclines 36. At the same time that the ring 34 is lifted the roller cage 31 is turned into the middle position by the movable stop 37 which is attached to the cage 31 at 37'. These two movements are produced if the direct drive is connected by means of an arm 42 which is mounted on the pivot 39 of the lever 4 exteriorly of the casing. This arm 42 has on its lower end two rollers 40 and 41, the former of which moves the stop 37 and the latter the stop 43 connected to a ring 35, said stops being held against the rollers by means of springs (not shown). This movement occurs in such a way that by the connection of the direct drive the ring 35, on the one hand, turns and thereby lifts the ring 34 while, on the other hand, the stop 37 contacts the roller 40, whereby the movement of the rollers 30 on the inclines 32 and $32^1$ of the ring 29 and consequently the stopping of the casing 18 is prevented. The rollers 30 then bear against the rings 28 and 29. The guide blade rim 22 tends to rotate the casing 18 and the disc 27 in the opposite direction to that of the pump 8. The disc 28 turns somewhat therewith and thus turns the rollers 30 which run on the inclines 32 (Figure 2) and press the disc 27 with the pressure of the springs 38 against the stationary part 23.

When bringing into operation the backward drive automatic coupling of the parts 14, 15 and 16 with 18 is effected. The casing 18 in this case tends to rotate in the direction of rotation of the driving pump 8. The rollers 30 thus run on $32^1$ whereby a smooth coupling, free from shock, of the casing 18 with a stationary part 23 is effected. The bringing into operation of the direct drive again leads to the complete release of the parts 30, 28, 27 and 18. In this case the stop 37 again bears against the roller cage 31 the rollers 30 are thus protected against running automatically on to $32^1$ and the coupling between 18 and 23 cannot occur during direct drive.

Having thus described my invention what I claim as new and desire to secure by Letters Patent is:—

1. A hydraulic power transmission gearing, including a driving shaft, driven blade rims, a centrifugal driving pump relatively shiftable on said driving shaft to control said driven blade rims, a rotatably mounted casing enclosing said driving pump and driven blade rims, rotatably and axially shiftable guide blade rims associated with said driven blade rims, said guide rims being connectible with said casing by fluid pressure of said centrifugal pump, a fixed member, and a clutch to connect said casing to said fixed member.

2. A hydraulic power transmission gearing, including a driving shaft, driven blade rims adapted for forward movement, a centrifugal pump relatively shiftably mounted on said driving shaft to control said rims, a rotatably mounted casing enclosing said driving pump and said driven blade rims, a guide blade rim associated with said driven blade rims and rigidly connected with said casing, other blade rims for reverse drive, guide blade rims associated therewith, the last named guide blade rims being rotatable and axially shiftable on said driving shaft and connectible with said casing, a clutch between said casing and said axially shiftable guide blade rims, said clutch being actuated by the fluid pressure of said centrifugal pump acting on said guide blade rims for connecting the last named guide blade rims to said casing, a fixed member, and a second clutch to connect said casing to said fixed member.

3. A hydraulic power transmission gearing, including driven turbines and associated guide blade rims, the guide blade rims of one of said turbines being rotatable and axially shiftable, a driving shaft on which said last-named guide blade rims are loosely mounted, a centrifugal driving pump slidable longitudinally on said shaft, a rotatable and axially shiftable member for supporting the last-named guide blade rims, a casing enclosing said pump, a fixed member to which said casing is connectible, a clutch for connecting said casing and said fixed member, and a further clutch between said casing and said rotatable and axially shiftable guide blade rims, said casing and last-named guide blade rims forming a pressure space for receiving fluid pressure from said pump whereby to arrest said shiftable guide blade rims by said further clutch when said pump is cooperating with said shiftable guide blade rims and said one of said turbines.

4. A hydraulic power transmission gearing, including driven blade rims, rotatably mounted and releasable guide blade rims associated with said driven blade rims, a casing for said guide blade rims and to which the same are adapted to be connected, a driving shaft, a centrifugal driving pump axially slidable on said driving shaft and cooperating with any one of said driven blade rims, a fixed member, and a clutch between said casing and said fixed member.

5. A hydraulic power transmission gearing, including driven turbines and associated guide blade rims, a driving shaft, a driven shaft, a driving pump on said driving shaft cooperating with said turbines said turbines being connected to said driven shaft, a closed casing to which said guide blade rims of one of the turbines may be connected, a fixed member, and releasable members to connect said casing with said fixed member, said casing being rotatable and independent of said driving and driven shafts.

In testimony whereof I have affixed my signature.

HERMANN RIESELER.